July 30, 1963

M. C. KURZ 3,099,258

CATALYTIC HEATING APPARATUS

Filed Oct. 26, 1960

INVENTOR
Maurice Charles Kurz

BY Alexander Dowell

ATTORNEYS

United States Patent Office 3,099,258
Patented July 30, 1963

3,099,258
CATALYTIC HEATING APPARATUS
Maurice Charles Kurz, Geneva, Switzerland, assignor to Societe Calinter S.A., Geneva, Switzerland, a Swiss joint-stock company
Filed Oct. 26, 1960, Ser. No. 65,049
4 Claims. (Cl. 126—93)

This invention relates to heating apparatus wherein a liquid or gaseous fuel burns without any flame in contact with a catalytic surface.

In the known apparatus of this kind the catalytic surface is formed of a grid which supports the catalytic agent, generally constituted by platinized asbestos, the fuel being in the form of a vapor or of a gas such as butane gas. The gas or vapor is supplied into a feed chamber or box having a wall formed by the porous catalytic surface itself, and it passes through the latter to combine with atmospheric oxygen without any flame, whereby the said surface is brought to a high temperature and becomes incandescent. These apparatus are generally satisfactory for small heating capacities corresponding to catalytic surfaces of relatively reduced area, but their efficiency decreases rapidly when their capacity is increased.

According to the present invention this defect of apparatus of the prior art is due to the fact that air cannot easily reach the central zone of the catalytic surface, whereby combustion becomes defective in the said zone. The burnt gases still contain a noticeable quantity of unburnt fuel and the efficiency is lowered. The superficial temperature of the catalytic surface therefore decreases, whereby the heating action is reduced.

An object of the present invention is to avoid the above-mentioned disadvantages and to provide a high capacity catalytic heating apparatus wherein the whole area of the catalytic surface will be regularly brought to a very high temperature.

The present invention primarily consists in blowing an air draft substantially parallel to the catalytic surface and close to the latter to rapidly bring fresh air to the whole area of the said surface. This method eliminates the zones wherein combustion is defective owing to the lack of a sufficient quantity of oxygen, whereby a high temperature is regularly obtained on the whole area of the catalytic surface.

Another object of the invention consists in blowing radially an air draft towards the center of a catalytic surface of substantially circular contour. Considering the upwardly facing horizontal catalytic surface of an apparatus of conventional construction, the natural draft which results from operation of the apparatus causes formation of an ascending hot air column and the latter in turn produces a negative pressure or suction effect on the surface, whereby cold fresh air is caused to flow radially and inwardly on the surface. But the radial velocity of this flow is quite small and therefore this air is heated and deviated upwardly well before reaching the central zone of the surface. By blowing cold air radially and inwardly at a sufficient velocity, the said air is forced towards the center of the surface before being given time enough to substantially rise above the said surface.

In an embodiment of this invention the catalytic surface is wholly or in part surrounded by an annular air duct connected to the outlet of a blower, the said duct having a number of holes radially directed towards the centre of the surface. The surface may be horizontal and facing upwardly or downwardly, if desired, or it may be disposed vertically.

Figure 1:
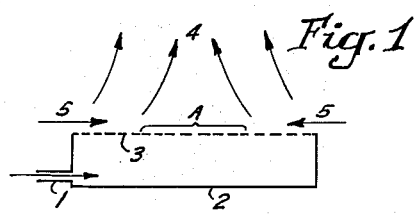
FIGS. 1 to 3 are three diagrammatical views explaining the general advantage of the present invention, FIG. 1 showing a conventional catalytic heating apparatus and FIGS. 2 and 3 illustrating two possible embodiments of apparatus according to the invention.

Referring to FIG. 1, in a conventional catalytic apparatus the fuel, as for instance butane gas, is supplied through a pipe such as 1 into a feed box 2, one wall of which, as for instance the upper wall, is in the form of a porous catalytic surface 3. The gas combines with atmospheric oxygen within or against surface 3 and thus burns without producing any flame, whereby surface 3 is brought to a high temperature. The combustion gases rise and thus produce an ascending draft 4 which in turn causes a negative pressure or suction effect which causes air to flow radially and inwardly, as indicated by arrows 5. The velocity of this air flow is relatively small and therefore as soon as the incoming air reaches the marginal zone of surface 3 it becomes hot enough to rise with the combustion gases before reaching the central zone A of surface 3 where combustion is thus defective and where therefore the superficial temperature remains relatively low.

Figure 2:
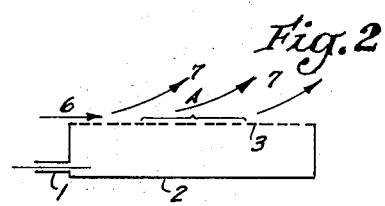

According to the present invention this may be avoided by blowing air under a high velocity in a direction parallel to surface 3 and close to the latter, as indicated by arrow 6 in FIG. 2. The air flow is heated by surface 3 and tends to rise, as illustrated by arrows 7, but owing to the high velocity a substantial portion of this air flow sweeps the whole area of surface 3 before its oxygen is completely exhausted. Combustion is therefore satisfactory even in the central zone A, the superficial temperature is higher, whereby heat radiation is increased, and moreover the apparatus acts as a hot air generator.

Figure 3:
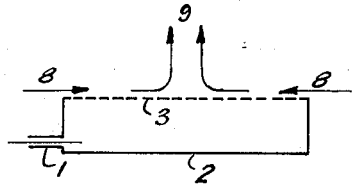

It is obvious that in the arrangement of FIG. 2 the left-hand edge receives cool air with a high quantity of oxygen, while the right-hand edge receives hot air with a reduced quantity of oxygen. This irregularity is avoided with the arrangement shown in FIG. 3. In this embodiment air is blown radially and inwardly towards the center of catalytic surface 3 from the whole periphery thereof, as illustrated by arrows 8. The air blown under a high velocity reaches the central zone of surface 3 where it forms with the combustion gases an ascending column 9 of relatively small diameter. The catalytic surface is thus swept regularly, cool air being distributed along the whole periphery thereof.

Figure 4:
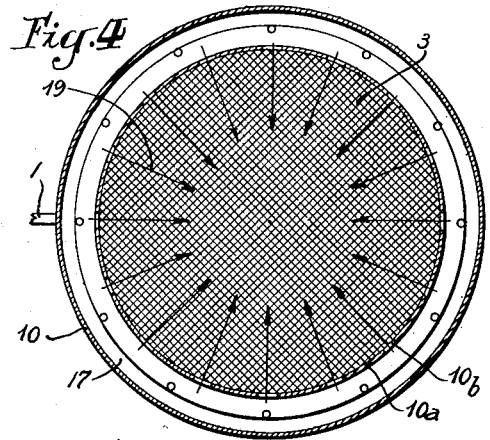
FIGS. 4 to 6 illustrate a first form of apparatus according to the present invention, with a downwardly directed horizontal catalytic surface, FIG. 6 being a front view, FIG. 5 a transverse vertical section and FIG. 4 a bottom plan view with section taken along line IV—IV of FIG. 5.
Figure 6:
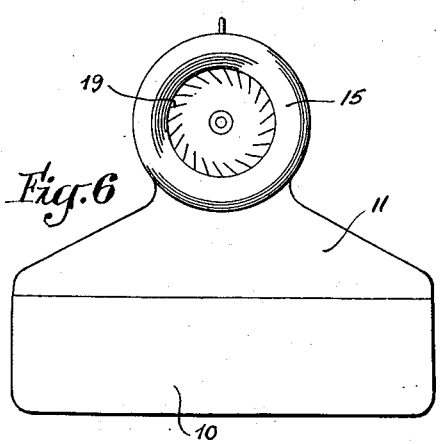
Figure 5:
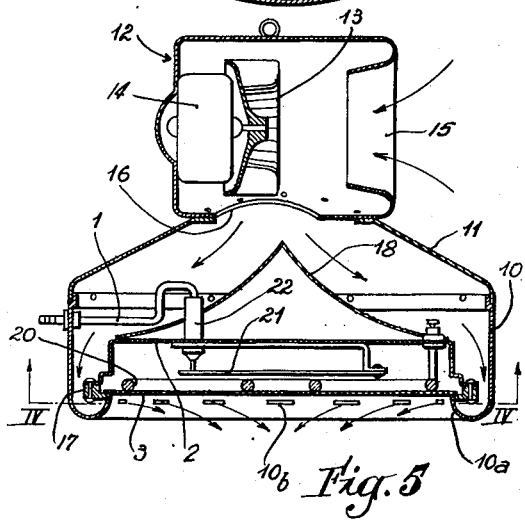

Referring to FIGS. 4 to 6 an apparatus in accordance with the present invention may comprise an outer casing 10 of substantially cylindrical form, having an upper frusto-conical extension 11 which supports a blower unit generally referenced 12, this unit comprising a centrifugal rotor 13 and an electric motor 14. Air is drawn through an end opening 15 and it is forced by rotor 13 through a passage 16 which connects blower 12 with extension 11. The lower edge of casing 10 is turned inwardly to form an annular gutter or channel 10a and the horizontal catalytic surface 3 is supported by the inner edge of this gutter or channel. The feed box 2 is disposed on surface 3, combustible gas being supplied by a pipe 1. The edge of box 2 is secured, as for instance by means of screws or rivets, to an annular frame or ring 17 in gas-tight engagement with the free inner edge of gutter or channel 10a. The wall of gutter or channel 10a has a plurality of regularly spaced horizontal slits 10b disposed close to surface 3.

In operation air forced by blower 12 flows downwardly into gutter or channel 10a and thence passes through slits 10b in the form of substantially flat high velocity air jets which sweep radially surface 3 towards the center thereof, as indicated by arrows 19 in FIG. 4. This radial and centripetal air draft produces the effects discussed with reference to FIG. 3. Combustion is uniform on the whole area of surface 3 which is regularly brought to a high temperature. As above explained, the apparatus operates by radiation from the incandescent catalytic surface and at the same time as a hot air generator, the hot air draft being directed downwardly in the present case.

Reference 20 designates electric resistances adapted to preheat surface 3 to initiate catalytic combustion. 21 is a safety bi-metallic member which actuates in the known manner a gas inlet valve 22 to close same if combustion stops.

In a typical apparatus according to FIGS. 4 to 6 the temperature of the catalytic surface was of about 1600° C. substantially on the whole area thereof. When the blower was stopped, the temperature of the marginal zone of the catalytic surface was reduced to about 1400° C. and the central zone became dark, which was an indication of a defective combustion.

Figure 7:
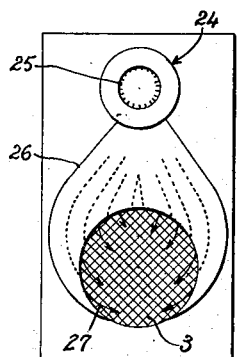
FIGS. 7 and 8 are respectively a view in elevation and a transverse vertical section of another construction wherein the catalytic surface is vertical.
Figure 8:
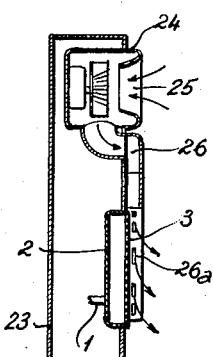

FIGS. 7 and 8 illustrate in a somewhat more diagrammatical manner another embodiment of the present invention, comprising a casing 23 having in the front wall thereof an aperture to receive the catalytic surface 3 and the feed box 2 associated therewith, surface 3 thus being vertical. The blower, generally referenced 24, draws atmospheric air through an inlet opening 25 and forces same into a duct 26, of flat shape and of substantial width, which surrounds the major portion of the periphery of surface 3. Slits 26a are provided in the wall of duct 26 close to surface 3 to cause formation of a number of air jets 27 which sweep the whole area of surface 3. These air jets are not exactly radial with respect to surface 3 (apart from the uppermost ones, as clearly shown in FIG. 7), but they are more or less directed inwardly.

What I claim is:

1. A heating apparatus comprising a substantially circular catalytic surface having a rear side and a quite uncovered front side adapted to freely radiate heat into the ambient atmosphere; means to supply a fuel under gaseous form to the rear side of said surface substantially in the absence of air, to cause said fuel to pass through said surface and to catalytically combine with atmospheric oxygen; and means to blow air close to the front side of said surface in substantially parallel relation thereto and inwardly with respect thereto from substantially the whole periphery thereof.

2. A heating apparatus comprising a substantially circular porous catalytic surface having a rear side and a quite uncovered front side adapted to freely radiate heat into the ambient atmosphere; means to supply a fuel under gaseous form to the rear side of said surface substantially in the absence of air, to cause said fuel to pass through said surface and to catalytically combine with atmospheric oxygen; an annular air distributor duct surrounding the front side of said surface, the wall of said duct having perforations to produce air jets radially directed inwardly of said surface and close to the front side thereof; and means to force air into said duct.

3. A heating apparatus comprising a supply box adapted to receive a fuel under gaseous form, substantially in the absence of air, said box having a substantially cylindrical lateral wall and a transverse wall closing one of the ends of said cylindrical wall; a substantially circular porous catalytic surface to close the other end of said supply box to form therewith a catalytic burner unit, the fuel of said box passing through said surface to catalytically combine with atmospheric oxygen; an air chamber having a substantially circular aperture in which said burner unit is disposed with said surface facing outwardly of said chamber to freely radiate heat into the ambient atmosphere, the wall of said chamber forming around said aperture an inwardly opening substantially U-shaped annular channel with the inner edge of said channel connected in gas-tight manner with the edge of said burner unit, and the wall of said channel having perforations to produce air jets radially directed inwardly of said surface close to the side thereof opposed to said supply box and substantially along the whole periphery thereof; and a blower to force air into said air chamber.

4. In a heating apparatus as claimed in claim 3, said burner unit being horizontal with said catalytic surface facing downwardly.

References Cited in the file of this patent
UNITED STATES PATENTS

| | | |
|---|---|---|
| 1,380,135 | Corbin | May 31, 1921 |
| 2,247,035 | Pravaz | June 24, 1941 |
| 2,311,350 | Richardson | Feb. 16, 1943 |
| 2,321,940 | Robertson | June 15, 1943 |
| 2,834,279 | Thompson | May 13, 1958 |
| 2,936,751 | Forniti | May 17, 1960 |

FOREIGN PATENTS

| | | |
|---|---|---|
| 1,070,317 | France | Feb. 17, 1954 |
| 1,083,586 | France | Sept. 28, 1955 |
| 1,136,829 | France | Jan. 7, 1957 |